(12) United States Patent
Okuda et al.

(10) Patent No.: US 10,377,322 B2
(45) Date of Patent: Aug. 13, 2019

(54) IN-VEHICLE CAMERA AND VEHICLE CONTROL SYSTEM

(71) Applicant: DENSO CORPORATION, Kariya, Aichi-pref. (JP)

(72) Inventors: Syo Okuda, Nagoya (JP); Toshikazu Murao, Obu (JP); Kentarou Shiota, Nagoya (JP); Naoki Sugiyama, Obu (JP); Takayuki Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/034,387

(22) Filed: Jul. 13, 2018

(65) Prior Publication Data

US 2018/0319351 A1   Nov. 8, 2018

Related U.S. Application Data

(63) Continuation of application No. 15/643,571, filed on Jul. 7, 2017, which is a continuation of application (Continued)

(30) Foreign Application Priority Data

Feb. 10, 2011 (JP) ................... 2011-027565

(51) Int. Cl.
*B60R 11/04* (2006.01)
*B60W 10/18* (2012.01)
(Continued)

(52) U.S. Cl.
CPC ............. *B60R 11/04* (2013.01); *B60W 10/18* (2013.01); *B60W 10/20* (2013.01); *B60W 10/30* (2013.01);
(Continued)

(58) Field of Classification Search
None
See application file for complete search history.

(56) References Cited

U.S. PATENT DOCUMENTS

| 5,796,430 A | 8/1998 | Katoh et al. |
| 6,204,881 B1 | 3/2001 | Ikeda et al. |

(Continued)

FOREIGN PATENT DOCUMENTS

| DE | 102006022404 A1 | 11/2007 |
| DE | 102007034608 A1 | 1/2009 |

(Continued)

OTHER PUBLICATIONS

U.S. Appl. No. 15/643,571.
(Continued)

*Primary Examiner* — Clayton E. LaBalle
*Assistant Examiner* — Linda B Smith
(74) *Attorney, Agent, or Firm* — Harness, Dickey & Pierce, P.L.C.

(57) ABSTRACT

An in-vehicle camera is provide which has a case and a lens, and which is attached in a vehicle interior so that the lens is exposed at a top face of the case and the top face is opposed to a windshield or another window. The top face has an angular shape bent at a ridge line passing through the top face. The lens is positioned in the vicinity of the ridge line. The in-vehicle camera includes a hood attached to a front portion of the case, the front portion being positioned at a front side of the case with respect to the lens.

17 Claims, 13 Drawing Sheets

Related U.S. Application Data

No. 14/919,758, filed on Oct. 22, 2015, now Pat. No. 10,046,716, which is a continuation-in-part of application No. 13/366,799, filed on Feb. 6, 2012, now Pat. No. 9,193,308.

(51) Int. Cl.

| | |
|---|---|
| *B60W 10/20* | (2006.01) |
| *B60W 10/30* | (2006.01) |
| *B60W 30/085* | (2012.01) |
| *B60W 30/09* | (2012.01) |
| *B60W 30/14* | (2006.01) |
| *H04N 5/225* | (2006.01) |
| *G06K 9/00* | (2006.01) |
| *B60R 11/00* | (2006.01) |

(52) U.S. Cl.
CPC .......... *B60W 30/085* (2013.01); *B60W 30/09* (2013.01); *B60W 30/143* (2013.01); *G06K 9/00791* (2013.01); *H04N 5/2254* (2013.01); *B60R 2011/0026* (2013.01); *B60W 2420/42* (2013.01); *B60W 2710/18* (2013.01); *B60W 2710/20* (2013.01); *B60W 2710/30* (2013.01); *B60W 2720/10* (2013.01)

(56) References Cited

U.S. PATENT DOCUMENTS

| | | | |
|---|---|---|---|
| 6,386,742 B1 | 5/2002 | DeLine et al. | |
| 6,587,152 B1 | 7/2003 | Sharp et al. | |
| 6,611,610 B1 | 8/2003 | Stam et al. | |
| 7,111,996 B2 | 9/2006 | Seger et al. | |
| 7,438,774 B2 | 10/2008 | Kurfiss et al. | |
| 7,480,149 B2 * | 1/2009 | Deward ................ | B60R 11/04 340/438 |
| 7,512,252 B2 | 3/2009 | Otsuka et al. | |
| 7,865,280 B2 | 1/2011 | Fujinawa et al. | |
| 7,967,371 B2 | 6/2011 | Khanna et al. | |
| 8,192,095 B2 | 6/2012 | Kortan et al. | |
| 8,508,594 B2 | 8/2013 | Fishman | |
| 8,531,278 B2 | 9/2013 | DeWard et al. | |
| 8,548,315 B2 | 10/2013 | Okuda | |
| 9,090,213 B2 | 7/2015 | Lawlor et al. | |
| 9,139,140 B2 | 9/2015 | Karl | |
| 9,225,884 B2 | 12/2015 | Blake, III et al. | |
| 9,487,159 B2 | 11/2016 | Achenbach | |
| 9,871,971 B2 * | 1/2018 | Wang ................... | H04N 7/183 |
| 2003/0010890 A1 | 1/2003 | Sakata | |
| 2003/0059217 A1 | 3/2003 | Baek | |
| 2004/0027458 A1 | 2/2004 | Takada | |
| 2004/0051790 A1 | 3/2004 | Tamaru et al. | |
| 2004/0091133 A1 | 5/2004 | Monji | |
| 2006/0087747 A1 | 4/2006 | Ohzawa et al. | |
| 2006/0125919 A1 | 6/2006 | Camilleri et al. | |
| 2007/0164188 A1 | 7/2007 | Mordau et al. | |
| 2007/0183657 A1 | 8/2007 | Kidono et al. | |
| 2008/0030374 A1 | 2/2008 | Kumon et al. | |
| 2008/0165264 A1 | 7/2008 | Saito et al. | |
| 2008/0218597 A1 | 9/2008 | Cho | |
| 2008/0219585 A1 | 9/2008 | Kasai et al. | |
| 2008/0303919 A1 | 12/2008 | Egawa | |
| 2009/0010494 A1 | 1/2009 | Bechtel et al. | |
| 2009/0046150 A1 | 2/2009 | Hayakawa et al. | |
| 2009/0295181 A1 | 12/2009 | Lawlor et al. | |
| 2010/0065707 A1 | 3/2010 | Hansel | |
| 2010/0254595 A1 | 10/2010 | Miyamoto | |
| 2010/0259628 A1 | 10/2010 | Rous | |
| 2010/0265328 A1 | 10/2010 | Chou | |
| 2010/0265330 A1 | 10/2010 | Li et al. | |
| 2011/0163904 A1 | 7/2011 | Alland et al. | |
| 2011/0233248 A1 | 9/2011 | Flemming et al. | |
| 2011/0234805 A1 | 9/2011 | Matsuda et al. | |
| 2011/0267467 A1 | 11/2011 | Kimura et al. | |
| 2012/0001791 A1 | 1/2012 | Wintermantel | |
| 2012/0026330 A1 | 2/2012 | Huelsen et al. | |
| 2012/0033079 A1 | 2/2012 | Karl | |
| 2012/0062746 A1 | 3/2012 | Otsuka et al. | |
| 2012/0075471 A1 | 3/2012 | Seger et al. | |
| 2012/0081544 A1 | 4/2012 | Wee | |
| 2012/0310519 A1 | 12/2012 | Lawlor et al. | |
| 2013/0050489 A1 | 2/2013 | Taylor et al. | |
| 2014/0016919 A1 | 1/2014 | Okuda | |
| 2014/0160284 A1 * | 6/2014 | Achenbach ......... | H04N 5/2251 348/143 |
| 2014/0232900 A1 | 8/2014 | Wernersson | |
| 2014/0347530 A1 | 11/2014 | Kanou et al. | |
| 2015/0042874 A1 | 2/2015 | Takeda | |
| 2015/0124150 A1 | 5/2015 | Hibino | |
| 2015/0172618 A1 | 6/2015 | Takahashi et al. | |
| 2016/0009230 A1 * | 1/2016 | Miyado ................ | B60R 11/04 224/482 |
| 2016/0023620 A1 * | 1/2016 | Matori ................. | B60R 11/04 348/148 |
| 2016/0144797 A1 | 5/2016 | Hoellt et al. | |

FOREIGN PATENT DOCUMENTS

| | | |
|---|---|---|
| EP | 1400916 A2 | 3/2004 |
| EP | 1887492 A1 | 2/2008 |
| EP | 2189340 A2 | 5/2010 |
| JP | S5979872 A | 5/1984 |
| JP | 10-269352 | 10/1998 |
| JP | 11-078717 | 2/1999 |
| JP | 2002-341432 A | 11/2002 |
| JP | 2003-025928 A | 1/2003 |
| JP | 2004-075033 A | 3/2004 |
| JP | 2005-092857 A | 4/2005 |
| JP | 2005-157670 A | 6/2005 |
| JP | 4034565 B2 | 1/2008 |
| JP | 2008040615 A | 2/2008 |
| JP | 2009-061812 A | 3/2009 |
| JP | 2010-020483 A | 1/2010 |
| JP | 2010-102572 A | 5/2010 |
| JP | 2010141583 A | 6/2010 |
| JP | 2011-233763 A | 11/2011 |
| JP | 2012-073927 A | 4/2012 |
| JP | 2012-080517 A | 4/2012 |
| JP | 2012-088785 A | 5/2012 |
| JP | 2012-146142 A | 8/2012 |
| JP | 05-032191 B2 | 9/2012 |
| JP | 05-176233 B2 | 4/2013 |
| WO | WO-2010/042483 A1 | 4/2010 |
| WO | WO-2013088821 A1 | 6/2013 |

OTHER PUBLICATIONS

Office Action dated Jun. 7, 2016 issued in U.S. Appl. No. 14/593,136.
Office Action dated Apr. 11, 2016 issued in U.S. Appl. No. 14/497,450.
Office Action dated Apr. 23, 2013 in corresponding Japanese Application No. 2011-126474 with English translation.
Office Action dated Jan. 29, 2013 in corresponding Japanese Application No. 2011-027565 with English translation.
Office Action dated Mar. 18, 2014 in corresponding Japanese Application No. 2013-143221 with English translation.
Office Action dated Mar. 21, 2014 in co-pending U.S. Appl. No. 14/031,103.
Office Action dated Oct. 21, 2014 in corresponding Japanese Application No. 2013-143221 with English translation.
Office Action dated Mar. 4, 2015 in corresponding Japanese Application No. 2013-143221 with English translation.
Extended European Search Report dated Aug. 14, 2015, issued in the corresponding European Application No. 14186537.8.

* cited by examiner

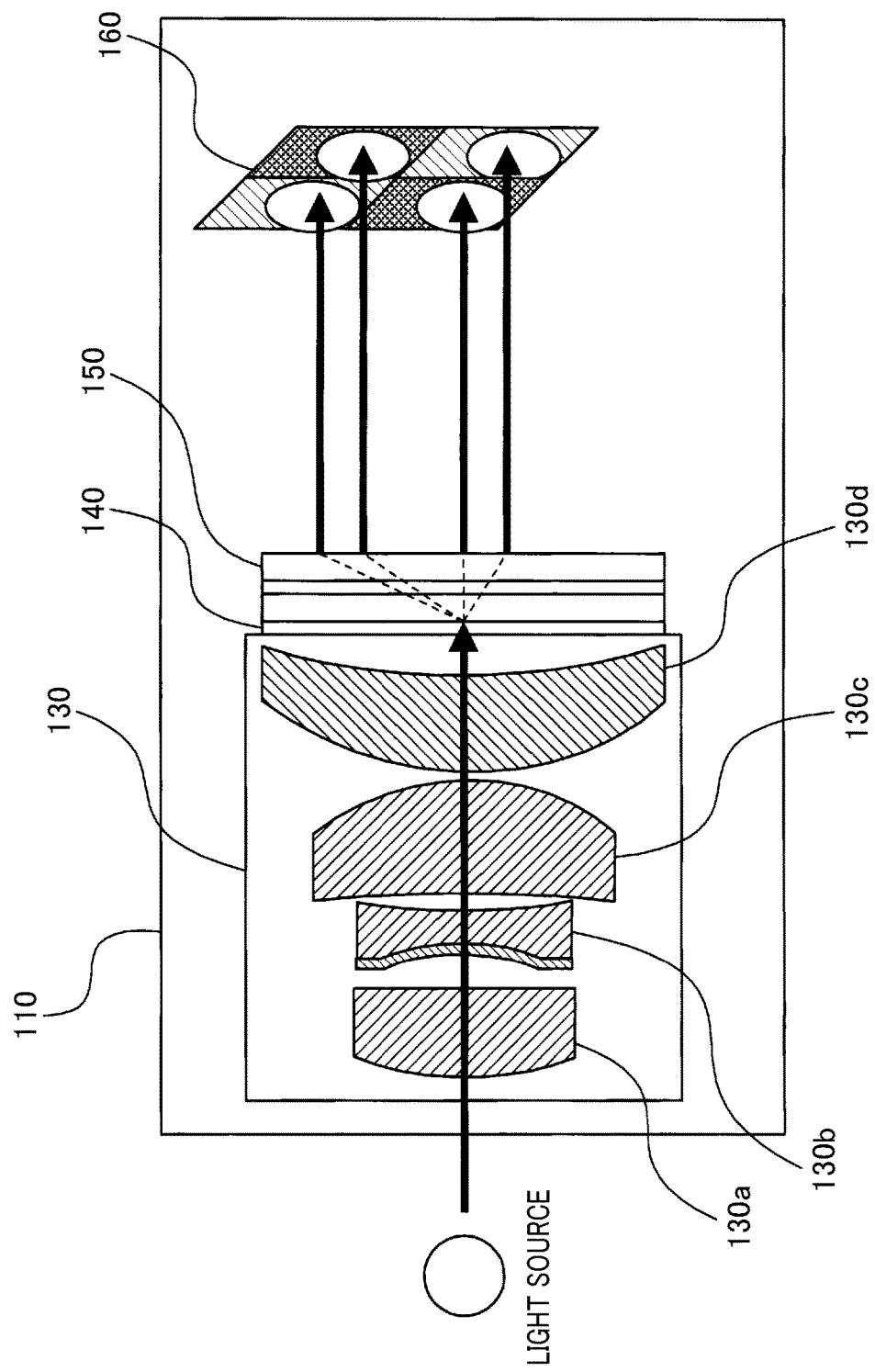

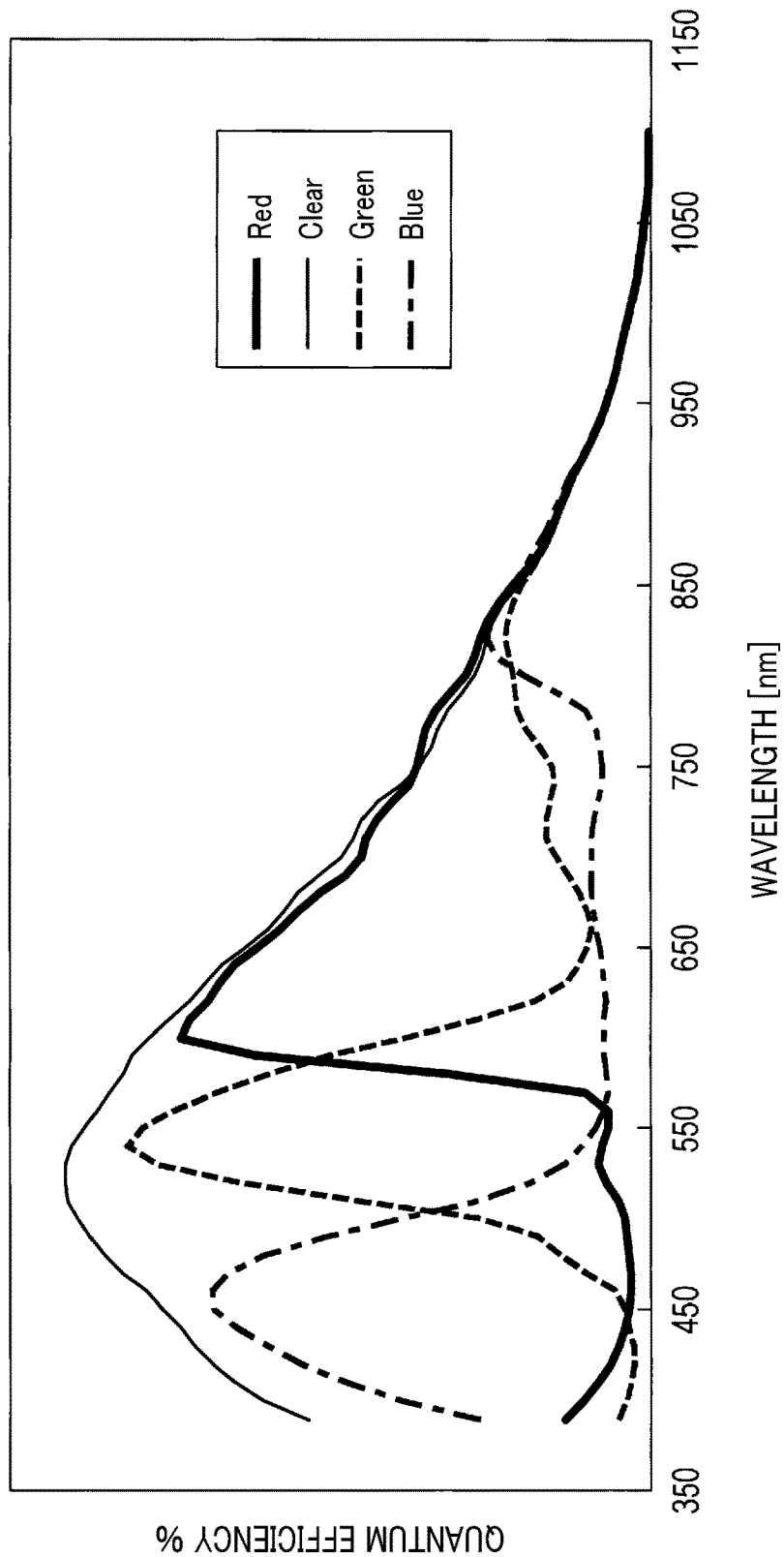

IN-VEHICLE CAMERA AND VEHICLE CONTROL SYSTEM

CROSS-REFERENCE TO RELATED APPLICATION

This application is a continuation of U.S. Ser. No. 15/643,571 filed Jul. 7, 2017 which is a continuation of U.S. Ser. No. 14/919,758 filed Oct. 22, 2015 which is a continuation-in-part of U.S. Ser. No.13/366,799 filed Feb. 6, 2012 and claims priority from earlier Japanese Patent Application No. 2011-27565 filed Feb. 10, 2011, the descriptions of which are incorporated herein by reference.

BACKGROUND

Technical Field

The present invention relates to an in-vehicle camera and a vehicle control system.

Related Art

In recent years, techniques have been in practical use in which an in-vehicle camera is installed in a vehicle. According to the techniques, assistance for driving the vehicle is performed by using images taken by the in-vehicle camera (refer to JP-UM-A-5-32191).

The in-vehicle camera may be attached to a windshield from the inside of the vehicle. This type of in-vehicle camera is attached so that the top face of a case thereof is opposed to the windshield. In addition, the top face of the case is inclined downward depending on the inclination angle of the windshield. The lens of the camera is exposed at the top face of the case.

The inclination angle of the windshield varies depending of the type of vehicle. Meanwhile, the in-vehicle camera is attached so as to constantly face in a constant direction with respect to a road surface. Hence, the inclination angle of the top face of the in-vehicle camera, which is attached to the windshield, is uniformly determined for each in-vehicle camera. Therefore, in a certain type of vehicle, as shown in FIG. 8, the inclination angle of the top face 203 of the in-vehicle camera 201 does not agree with the inclination angle of a windshield 101, whereby a lens 205 of the in-vehicle camera 201 is distanced from the windshield 101. In this case, a phenomenon is caused in which light L coming from the lower side is reflected off the windshield 101 and enters the lens 205 (reflection). To prevent this reflection, a hood 207, which is attached to the lower side of the lens 205, is required to project longer toward the front side so as to shield the light L. However, if such a long hood 207 is attached, it becomes difficult to install the in-vehicle camera 201 in a narrow space.

SUMMARY

An embodiment provides an in-vehicle camera in which reflection is prevented even when the inclination angle of a windshield varies.

As an aspect of the embodiment, an in-vehicle camera is provide which has a case and a lens, and which is attached in a vehicle interior so that the lens is exposed at a top face of the case and the top face is opposed to a windshield or another window. The top face has an angular shape bent at a ridge line passing through the top face. The lens is positioned in the vicinity of the ridge line. The in-vehicle camera includes a hood attached to a front portion of the case, the front portion being positioned at a front side of the case with respect to the lens.

BRIEF DESCRIPTION OF THE DRAWINGS

In the accompanying drawings:

FIG. 10 is a schematic diagram illustrating a sensor section;

FIG. 12 is a graph showing transmission characteristics of the filters that configure the RGBC Bayer;

DETAILED DESCRIPTION OF THE PREFERRED EMBODIMENTS

With reference to the accompanying drawings, hereinafter are described embodiments of the present invention.

[First Embodiment]

Figure 1:
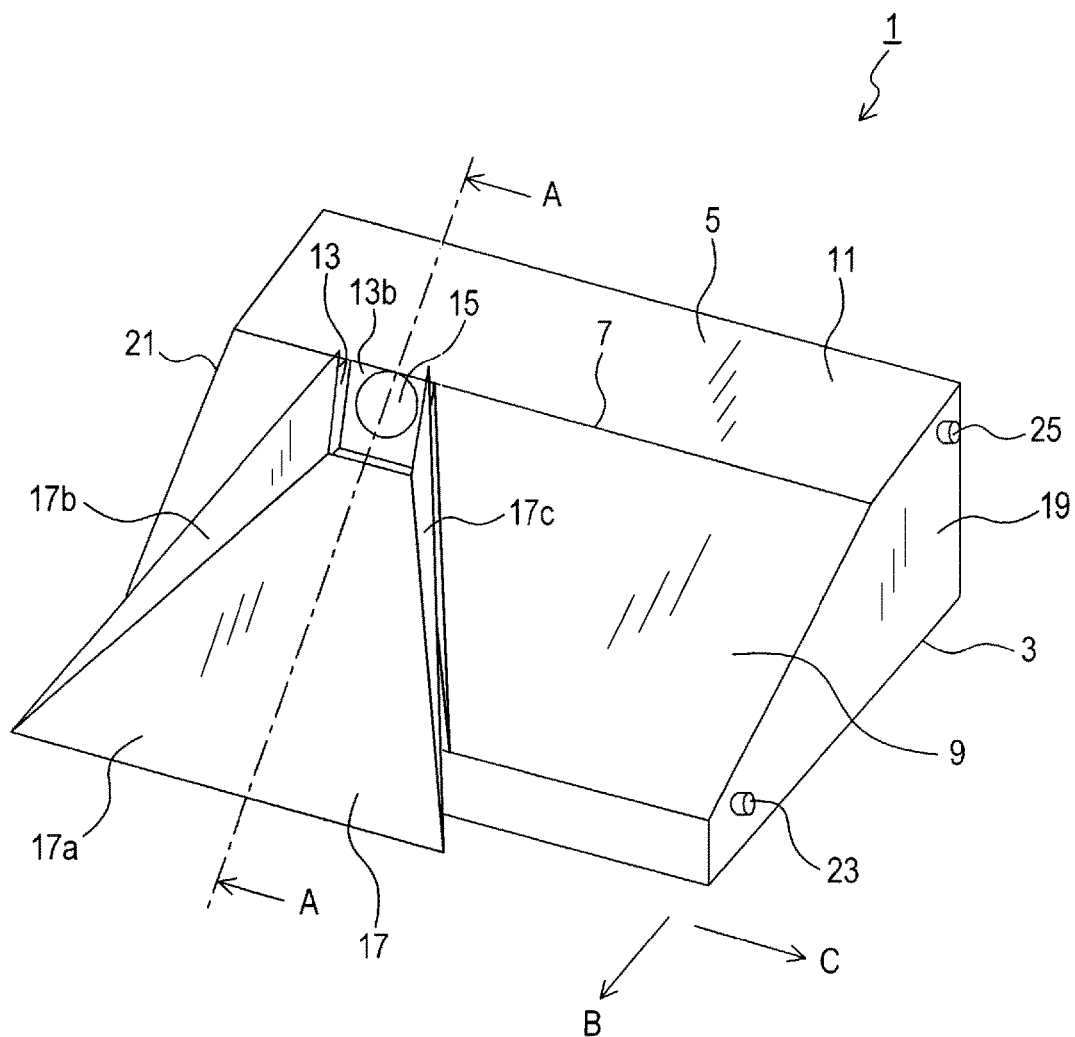
FIG. 1 is a perspective view of an in-vehicle camera according to a first embodiment.
Figure 2:
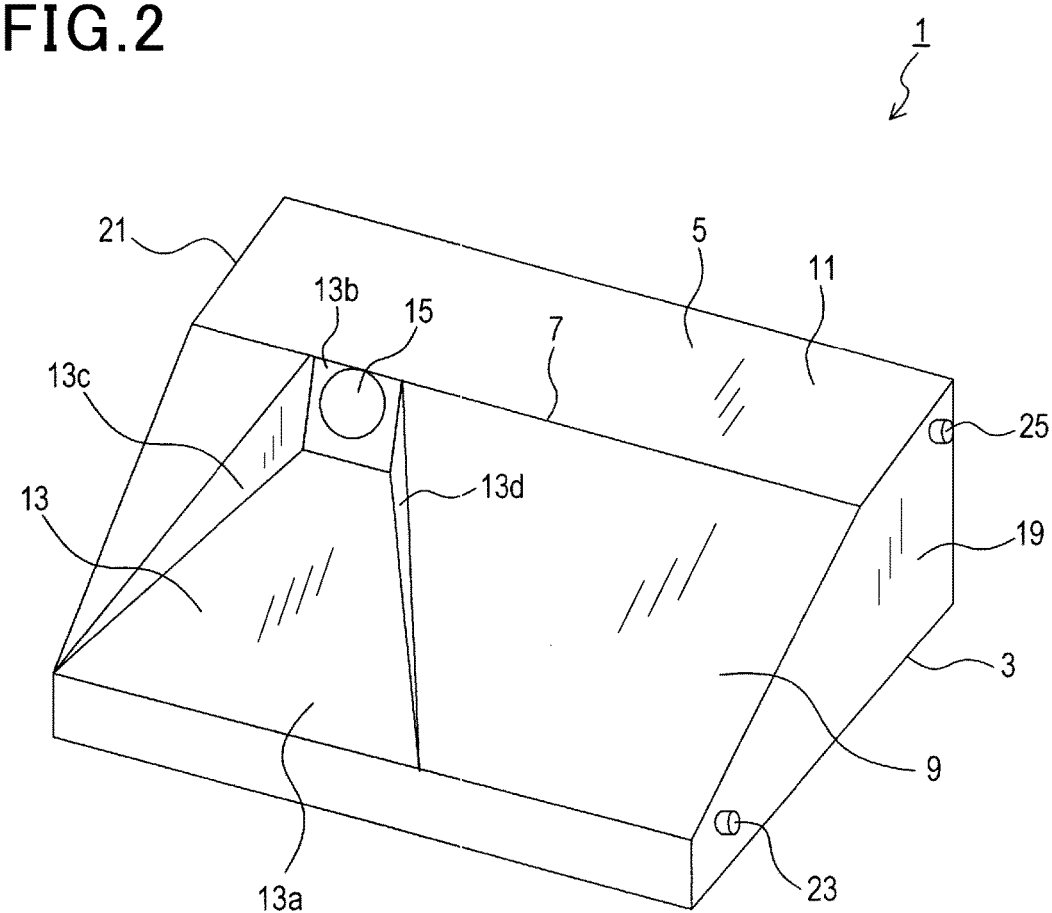
FIG. 2 is a perspective view of the in-vehicle camera (from which a hood is removed)
Figure 3:
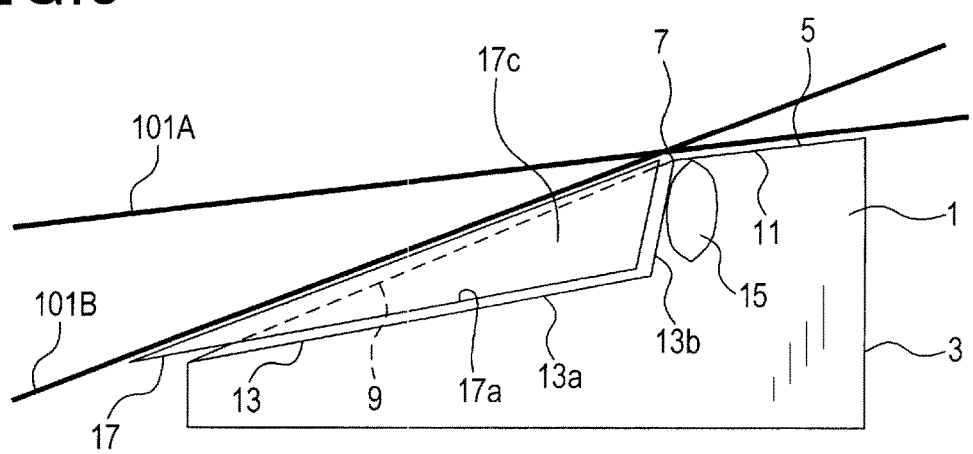
FIG. 3 is a sectional side view taken along a line A-A in FIG. 1.
Figure 4:
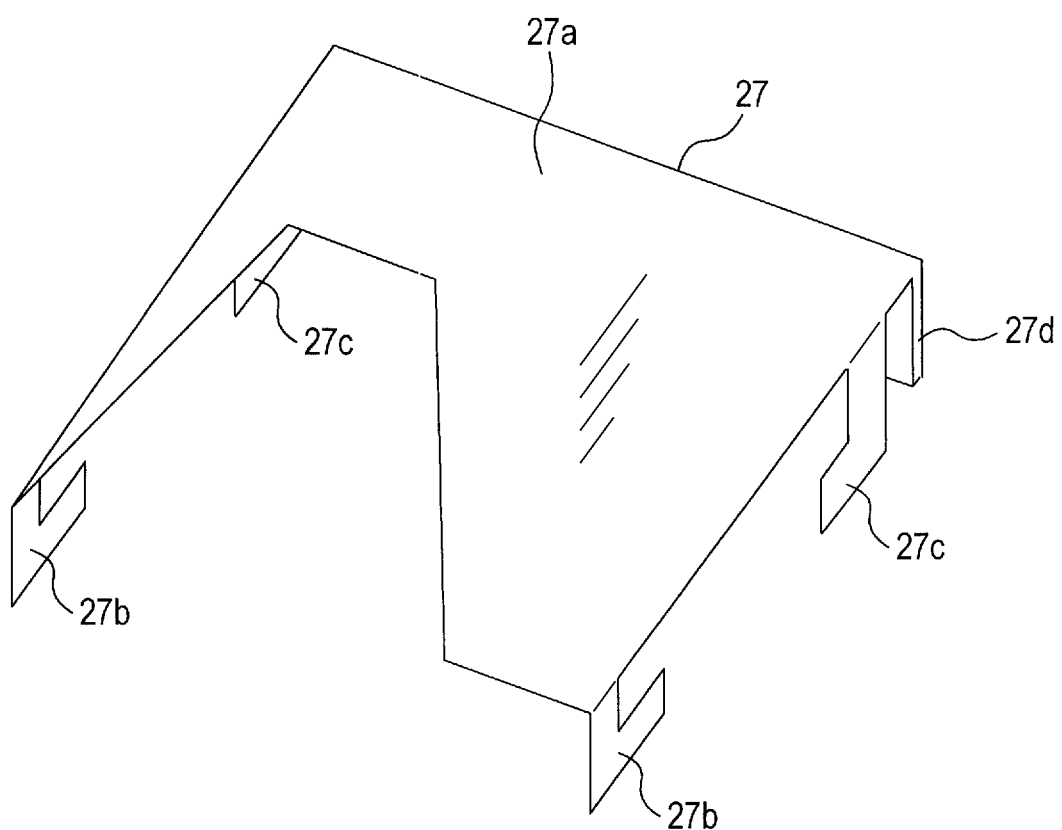
FIG. 4 is a perspective view of a bracket.
Figure 5:
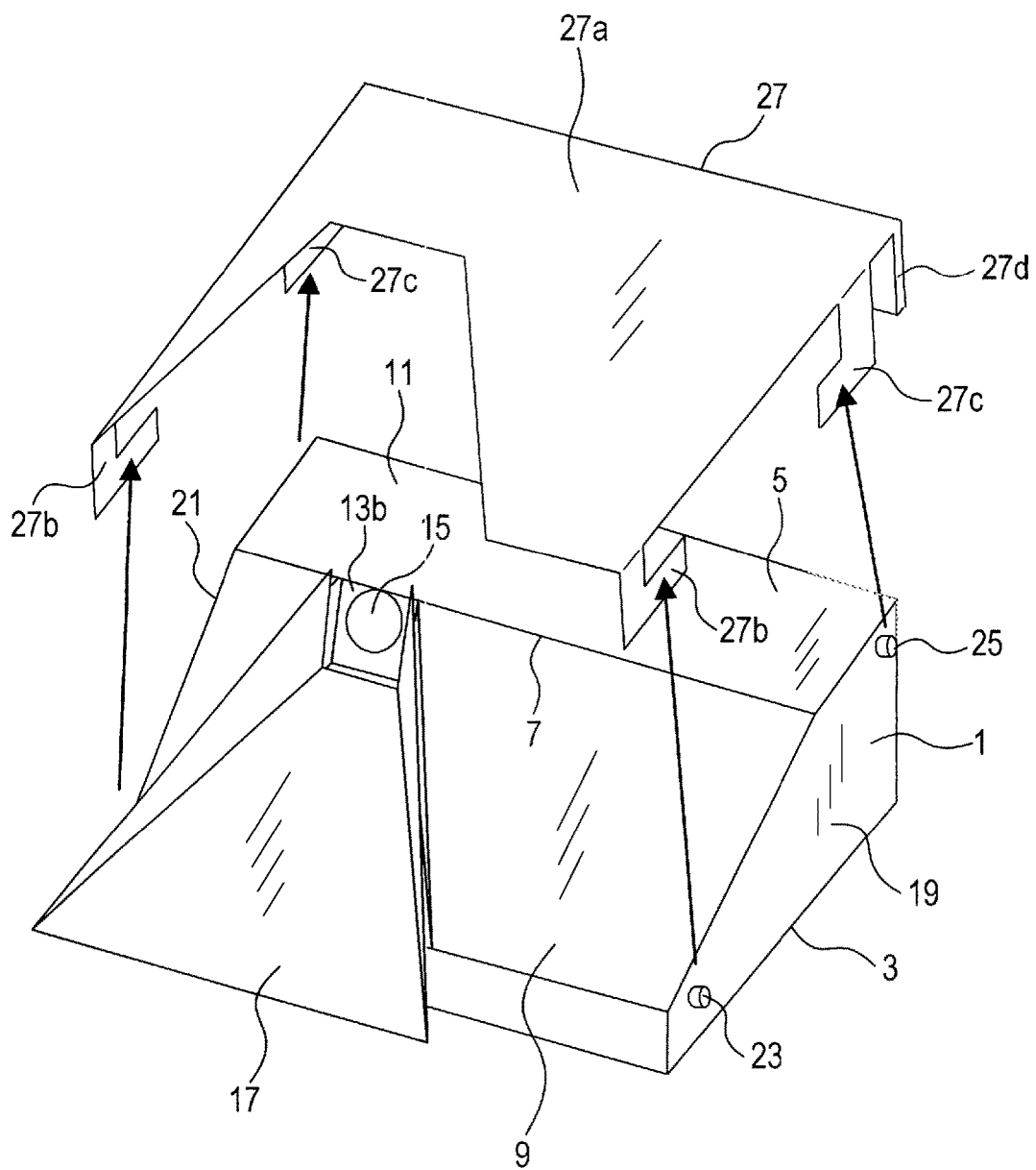
FIG. 5 is a diagram for explaining a method of attaching the in-vehicle camera to the bracket.
Figure 6A:
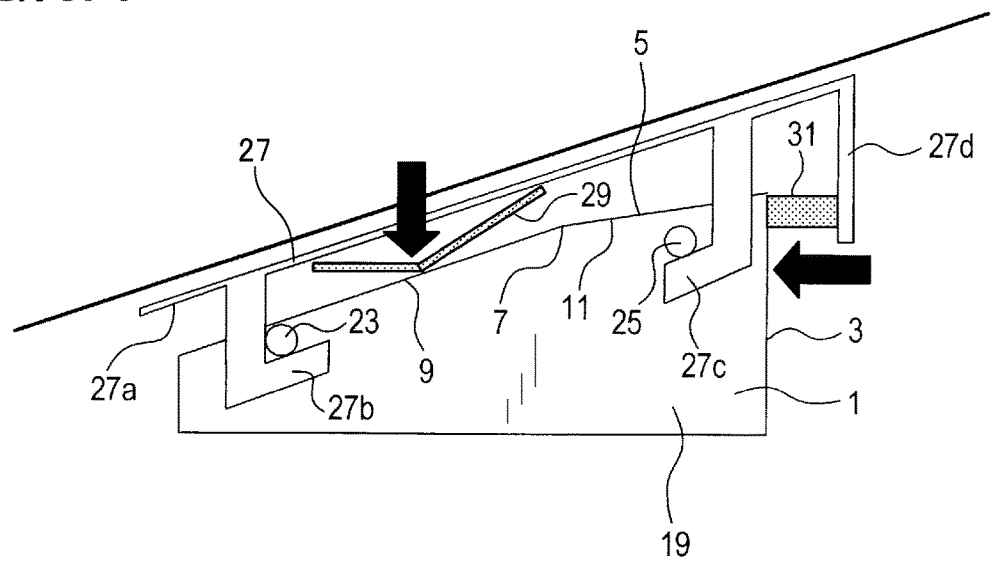
FIGS. 6A and 6B are diagrams for explaining states in which the in-vehicle camera is attached to the bracket.

1. The Configuration of an In-Vehicle Camera 1:

Hereinafter, the configuration of the in-vehicle camera 1 will be described with reference to FIGS. 1 to 6B. FIG. 1 is a perspective view of the in-vehicle camera 1. FIG. 2 is a perspective view of the in-vehicle camera 1 (from which a hood 17 described later is removed). FIG. 3 is a sectional side view taken along a line A-A in FIG. 1. FIG. 4 is a perspective view of a bracket 27 described later. FIG. 5 is a diagram for explaining a method of attaching the in-vehicle camera 1 to the bracket 27. FIG. 6A is a diagram for explaining a state in which the in-vehicle camera 1 is attached to the bracket 27.

The in-vehicle camera 1 is attached in a vehicle interior. As shown in FIGS. 1 and 2, the in-vehicle camera 1 includes a case 3 and components (not shown) of a well-known camera housed in the case 3. All of the top face 5 of the case 3 is inclined downward toward the front side (in the direction B shown in FIG. 1). The top face 5 is divided into a top face front portion (first face) 9 and a top face rear portion (second face) 11 by a ridge line 7 passing through the top face. The ridge line 7 is parallel to the direction C perpendicular to the direction B (refer to FIG. 1). The top face front portion 9 is a flat surface except for a concave portion 13 described later. The top face rear portion 11 is also a flat surface. The inclination angle of the top face front portion 9

(except the concave portion 13) is greater than the inclination angle of the top face rear portion 11. Hence, as shown in FIG. 3, when viewing the in-vehicle camera 1 from the side, the top face 5 has a bent angular shape in which the ridge line 7 is the top (inflection point).

The top face front portion 9 has the concave portion 13 in a portion thereof including the front end. The concave portion 13 is concaved with respect to the periphery thereof. As shown in FIG. 2, the concave portion 13 includes an in-concave portion top face 13a, a lens mounted face 13b and a pair of right-and-left side faces 13c, 13d. The inclination angle of the in-concave portion top face 13a is less than those of other portions of the top face front portion 9. The lens mounted face 13b sharply and almost vertically stands at the rear side with respect to the in-concave portion top face 13a and faces toward the front side. A lens 15 is mounted on the lens mounted face 13b. That is, the lens 15 is exposed at the top face front portion 9.

The rear end of the concave portion 13 reaches the ridge line 7. The top edge of the lens mounted face 13b is aligned with the ridge line 7. The top of the lens 15 contacts the ridge line 7. Hence, the lens 15 is positioned in the vicinity of the ridge line 7.

In addition, as shown in FIG. 1, the in-vehicle camera 1 includes the hood 17 attached to the concave portion 13 of the case 3. The hood 17 includes a bottom face portion 17a and a pair of side face portions 17b, 17c which are provided so as to stand at both right and left sides of the bottom face portion 17a. When the hood 17 is attached to the concave portion 13, the bottom face portion 17a and the side face portions 17b, 17c are brought into contact with the in-concave portion top face 13a and the side faces 13c, 13d, respectively. In this state, the bottom face portion 17a projects longer than the case 3 toward the front side. The top edges of the side face portions 17b, 17c are inclined substantially to the same extent as the top face front portion 9, and project slightly longer than the top face front portion 9 to the top side. That is, the hood 17 is attached to the front portion of the case 3. The front portion is positioned at the front side of the case 3 with respect to the lens 15.

Cylindrical projections 23, 25 are respectively provided in the vicinity of the top edges of side faces 19, 21 positioned in the lateral direction of the case 3.

The in-vehicle camera 1 is attached to the windshield 101 of the vehicle by the bracket 27 shown in FIG. 4. The bracket 27 includes a top board 27a, latches 27b, 27c, a rear board 27d, a plate spring 29, and a plate spring 31. The top board 27a is bonded to the windshield 101. The latches 27b, 27c project downward at both right-and-left ends of the under surface of the top board 27a. The rear board 27d projects downward at the rear end of the under surface of the top board 27a. The plate spring 29 is provided at the center of the under surface of the top board 27a. The plate spring 31 is provided on the front side of the rear board 27d.

The in-vehicle camera 1 is attached to the bracket 27 as described below. The latches 27b, 27c of the bracket 27 have L shapes. As shown in FIG. 6A, the latches 27b, 27c latch the projections 23, 25 of the case 3 to suspend the in-vehicle camera 1 so as not to fall. In addition, as shown in FIG. 6A, the plate spring 29 biases the in-vehicle camera 1 downward. The plate spring 31 biases the in-vehicle camera 1 forward. As a result, the bracket 27 can fix the in-vehicle camera 1 without rattling.

As described above, the bracket 27 is fixed to the windshield 101 from the inside of the vehicle by bonding the top board 27a to the windshield 101. Hence, when the in-vehicle camera 1 is attached to the bracket 27, the in-vehicle camera 1 is attached to the windshield 101. In this case, the top face 5 of the in-vehicle camera 1 is opposed to the windshield 101.

Figure 6B:
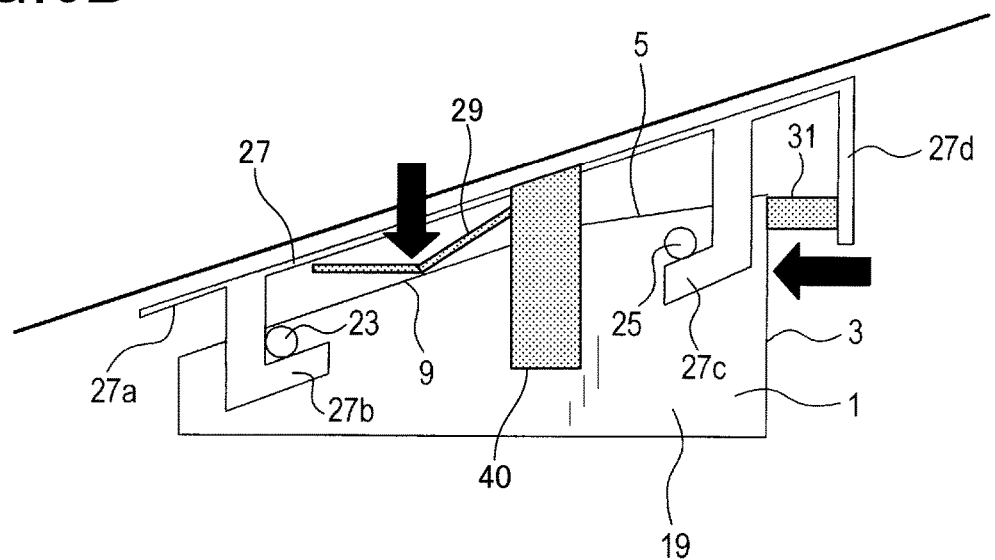

In addition, as shown in FIG. 6B, two plate springs 40 (only one is shown) may be provided to the top board 27a. The plate springs 40 are attached to both right-and-left sides of the top board 27a substantially at the centers of the right-and-left sides of the top board 27a. The plate springs 40 project downward from the top board 27a. The plate springs 40 bias the side faces 19, 21 of the case 3 of the in-vehicle camera 1 from the laterals (lateral sides, lateral surfaces) of the case 3. That is, the plate springs 40 bias the case 3 laterally from the laterals of the case 3. As a result, the bracket 27 can fix the in-vehicle camera 1 without rattling. Needless to say, this advantage can be also obtained when only one of the plate springs 40 is attached to the right or left side of the top board 27a.

Note that the case 3 can be fixed to the windshield 101 without using the bracket 27, for example, by bonding as shown in FIG. 3, so that the optical axis of the lens 15 is directed to the front side.

2. Advantages of the In-Vehicle Camera 1:

(1) The top face 5 of the in-vehicle camera 1 has a bent angular shape in which the ridge line 7 is the top (inflection point). Hence, as shown in FIG. 3, at least portion of the ridge line 7 of the top face 5 can be close to the windshield 101 in both cases of a windshield 101A having a steep inclination and a windshield 101B having a gentle inclination. Since the lens 15 is positioned in the vicinity of the ridge line 7, the lens 15 can be close to the windshield 101 in cases where the inclination angle of the windshield 101 is either relatively large or relatively small.

As a result, the phenomenon can be prevented in which the light L coming from the lower side is reflected off the windshield 101 and enters the lens 15 (reflection). In addition, since the large amount of projection of the hood 17 toward the front side is not required, the in-vehicle camera 1 can be installed in a narrow space. In addition, since it is not required to manufacture the cases 3 having different inclination angles of the top face 5 depending on the inclination angles of the windshields 101 (depending on the type of vehicle), the cost of manufacturing for the in-vehicle camera 1 can be reduced.

(2) When the in-vehicle camera 1 is attached so that the optical axis of the lens 15 is directed to the front side and the top face 5 is opposed to the windshield 101, the ridge line 7 is a straight line perpendicular to the direction in which the windshield 101 is inclined. Hence, even if inclination angles of the windshields 101 are different from each other, all of the ridge line 7 can be close to the windshield 101. Hence, the reflection can be further prevented.

(3) In the in-vehicle camera 1, the bent angular shape of the top face 5 is formed of two flat surfaces (the top face front portion 9 and the top face rear portion 11) divided by the ridge line 7. Hence, since portions of the top face 5 except the ridge line 7 (portions formed of the flat surfaces) do not protrude, the ridge line 7 can be further close to the windshield 101. Therefore, the reflection can be further prevented.

It will be appreciated that the present invention is not limited to the configurations described above, but any and all modifications, variations or equivalents, which may occur to those who are skilled in the art, should be considered to fall within the scope of the present invention.

For example, the bracket 27 may be attached to the ceiling of the vehicle interior or attached between the windshield 101 and the ceiling of the vehicle interior. In addition, the in-vehicle camera 1 may be attached to the rear window or in the vicinity thereof to take images of views from the rear of the vehicle. In this case, the in-vehicle camera 1 faces in the direction opposed to the direction in which the in-vehicle camera 1 faces when attached to the windshield 101. Furthermore, the in-vehicle camera 1 may be attached to a side window or in the vicinity thereof to take images of views from a side of the vehicle. In this case, the in-vehicle camera 1 faces in the direction substantially perpendicular to the direction in which the in-vehicle camera 1 faces when attached to the windshield 101.

The in-vehicle camera 1 may possibly not include the hood 17.

The top face front portion 9 (except the concave portion 13) and the top face rear portion 11 might not be exact flat surfaces. For example, the top face front portion 9 and the top face rear portion 11 may be provided with a convex portion which does not block a groove or the concave portion, and the lens 15 from being close to the windshield 101.

Figure 7:
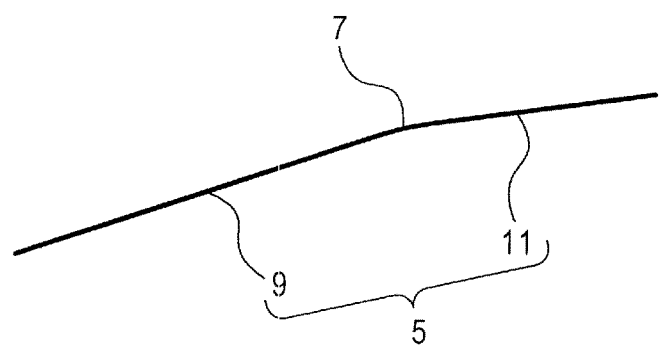
FIG. 7 is a side view showing a shape of a top face according to another embodiment.
Figure 8:
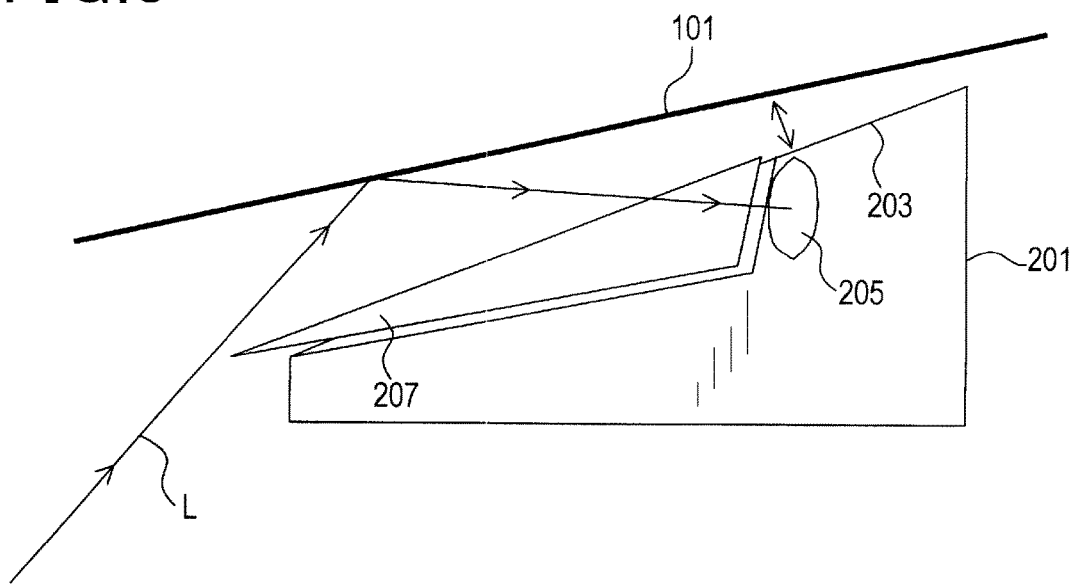
FIG. 8 is a side view showing a conventional in-vehicle camera.

The shape of the top face 5 viewed from the side may be the shape shown in FIG. 7. That is, the boundary (bent portion) between the top face front portion 9 (except the concave portion 13) and the top face rear portion 11 may be curved. In this case, the ridge line 7 may be a center line of the area which is curved.

The ridge line 7 may not be parallel to the direction C but be intersected with the direction C. That is, the ridge line 7 may be parallel to the direction in which the windshield 101 is inclined. The ridge line 7 may not be a straight line. For example, the ridge line 7 may be a curved line or a line bent in a dogleg shape or cranked shape.

[Second Embodiment]

<General Configuration>

Figure 9:
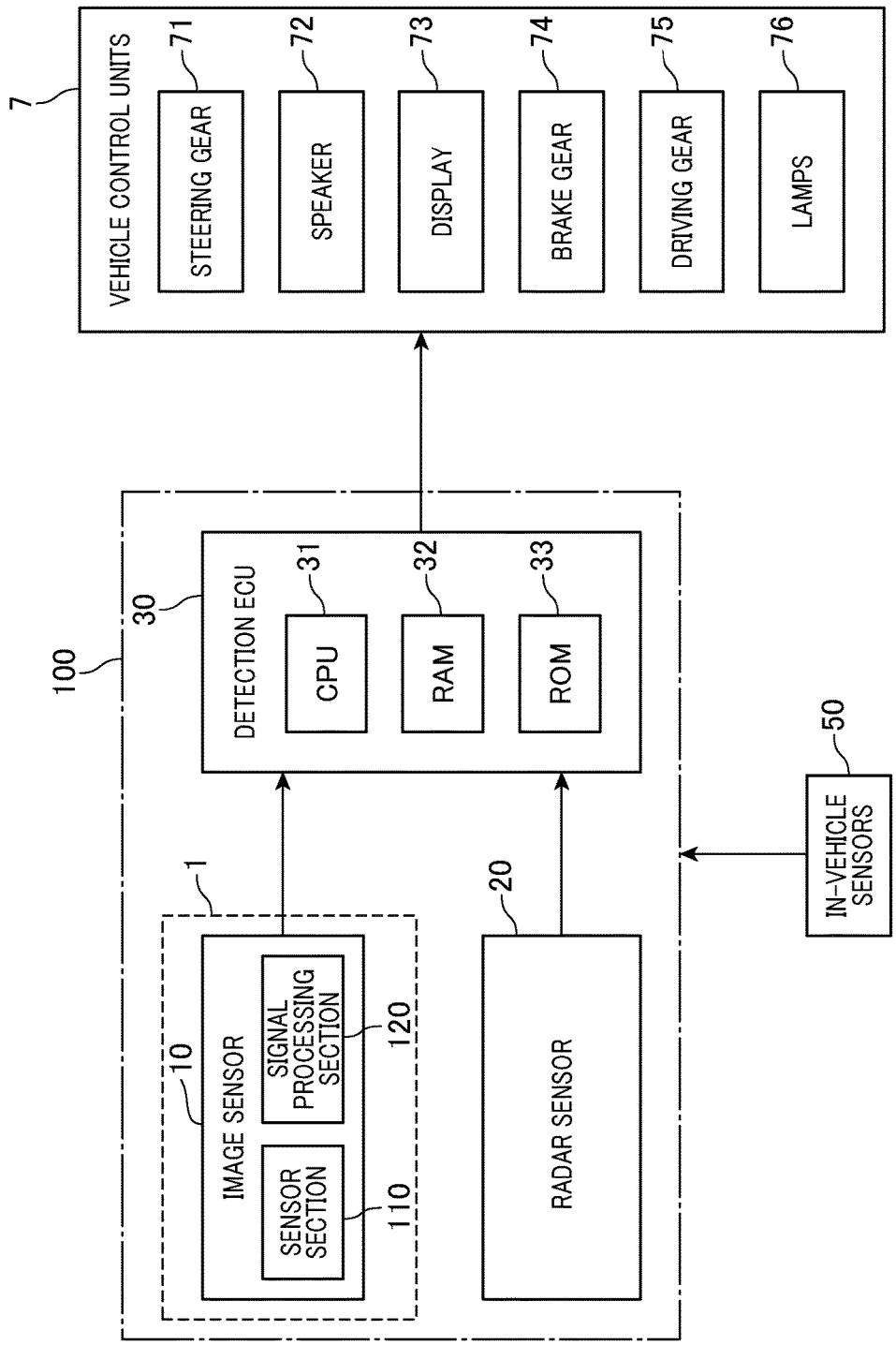
FIG. 9 is a block diagram illustrating a general configuration of a vehicle control system.

FIG. 9 is a block diagram illustrating a general configuration of a vehicle control system 100 according to a second embodiment. The vehicle control system 100 detects various objects that are present around the vehicle. Based on the detection results and various pieces of information acquired from in-vehicle sensors 50, the vehicle control system 100 performs various vehicle controls using vehicle control units 7.

The in-vehicle sensors 50 include sensors that detect the behaviors of the vehicle, and sensors that detect the environmental features surrounding the vehicle. The sensors that detect the behaviors of the vehicle include, for example, a vehicle speed sensor, various acceleration sensors and a steering-angle sensor. The sensors that detect the environmental features surrounding the vehicle include, for example, a unit for outputting position data of the own vehicle (e.g., GPS (global positioning system)), a unit serving as a source of supplying map data (e.g., navigation apparatus), a communication unit (e.g., mobile unit, such as a road-to-vehicle communication unit or a smartphone) and a radar. These sensors are used singly, or the detection results of the sensors are used in combination.

The vehicle control units 7 include a plurality of units that control controlled objects of a body system, a powertrain system and a chassis system of the vehicle. The controlled objects at least include a steering gear (e.g., electric power steering) 71, speaker 72, display 73, brake gear (e.g., brake) 74, driving gear (e.g., accelerator) 75 and lamps 76. The vehicle control units 7 control the behaviors of the controlled object in accordance with the running conditions of the vehicle. In addition, by controlling the behaviors of the controlled objects according to the instructions from a detection ECU 30, the vehicle control units 7 perform known vehicle controls, such as collision avoidance, speed warning, lane departure prevention, rear-end collision warning, inter-vehicle warning, lane departure warning, auto high beam, sign indication, full speed range adaptive cruise control (ACC), lane keeping, lane change accident prevention, blind spot warning, blind spot monitoring, automatic lane change, forward cross traffic warning, rearward cross traffic warning, erroneous pedal usage prevention, and automatic parking.

<Vehicle Control System>

The vehicle control system 100 includes the in-vehicle camera 1 describe in the first embodiment, a radar sensor 20 and the detection ECU 30. The in-vehicle camera 1 has an image sensor 10.

The image sensor 10 picks up an image in the forward direction of the vehicle to repeatedly acquire image data, and processes the acquired image data to detect an object that is present in a predetermined imaging range. The image sensor 10 generates object information including at least the position, width and height of an object and outputs the generated object information to the detection ECU 30 together with image data to be displayed.

The radar sensor 20 is a well-known sensor that transmits and receives radar waves of a millimeter-wave band or of laser beams to detect an object that is present in a predetermined exploration range and has reflected the radar waves. The radar sensor 20 generates object information at least including a distance to the object from the vehicle, speed of the object relative to the vehicle, and lateral location of the object with respect to the vehicle and outputs the generated object information to the detection ECU 30.

In generating information regarding a detected object, the image sensor 10 and the radar sensor 20 also make use of the information obtained from the in-vehicle sensors 50. The objects detected by the image sensor 10 and the radar sensor 20 include, for example, an obstacle, preceding vehicles, preceding pedestrians, preceding objects, stationary vehicles, stationary pedestrians, stationary objects, on-coming vehicles, on-coming pedestrians, on-coming objects, lanes, road surface conditions, road shapes, light sources, road signs, traffic signals, entities that cut off the field of view of the sensor section 110, and environmental features outside the vehicle. However, the sensors 10 and 20 do not necessarily have to detect all of these objects but may detect at least those objects which are required for a vehicle control process (discussed later) which is performed by the detection ECU 30.

The detection ECU 30 is mainly configured by a well-know microcomputer that includes at least a CPU 31, RAM 32 and ROM 33. The ROM 33 stores a control program for performing the vehicle control process which realizes the various vehicle controls mentioned above using the vehicle control units 7 on the basis of the information on a detected object, which is outputted from the image sensor 10 and the radar sensor 20. The detection ECU 30 outputs instructions to the vehicle control units 7. In particular, the detection ECU 30 outputs to the display 73 the image data generated by the image sensor 10, or data obtained by processing the image data so as to be suitable for information display.

It should be noted that, in the vehicle control process, all the vehicle controls mentioned above do not have to be necessarily realized but at least one of the vehicle controls may be ensured to be performed. The vehicle controls may be ensured to be properly performed in accordance with the instructions from an external unit or the information acquired from the in-vehicle sensors 50.

<Image Sensor>

The image sensor 10 includes a sensor section 110 and a signal processing section 120. The sensor section 110 converts incident light to electrical signals and outputs the converted signals. The signal processing section 120 carries out an image data generation process for generating image data from the outputs of the sensor section 110, and an object detection process for detecting various objects based on the image data that has been generated through the image data generation process and outputting the detection results to the detection ECU 30. The image sensor 10 is periodically activated to pick up images of the scenes outside the vehicle.

The sensor section 110 configures a monocular camera. FIG. 10 is a schematic diagram illustrating the sensor section 110. As shown in FIG. 10, the sensor section 110 includes a lens system 130, an infrared cut filter 140, an optical lowpass filter 150 and an image sensor assembly 160.

The lens system 130 is configured by a plurality of lenses that cause the incident light to form an image on a surface of the image sensor assembly 160. Specifically, the lens system 130 is configured by four lenses which are, from a light-incident side (the left side in the figure), a plano-convex lens 130a, a double concave lens 130b, a plano-convex lens 130c and a concave meniscus lens 130d. With these four lenses, the lens system 130 is ensured to have a structure that prevents aberrations, such as chromatic aberration and comatic aberration.

The infrared cut filter 140 is arranged downstream of the lens system 130 to cut off near-infrared rays included in the incident light. The optical lowpass filter 150 is arranged downstream of the infrared cut filter 140 and configured to split the incident light that has passed through the lens system 130 and the infrared cut filter 140 into four incident light rays, by using the polarization characteristics. The four incident light rays are each ensured to be inputted to any of four pixels that configure a basic unit of the image sensor assembly 160. In the image sensor assembly 160 of FIG. 10, only four pixels configuring the basic unit are shown being enlarged, for the sake of clarity of view and for easy understanding of the operation of the optical lowpass filter 150.

The lens system 130, the infrared cut filter 140 and the optical lowpass filter 150 are well known as disclosed, for example, in JP-A-2011-233763. Therefore, the explanation on the details is omitted.

The image sensor assembly 160 is configured by an array type image sensor and an RGBC Bayer. The array type image sensor is a well-known sensor in which light-receiving elements, such as CMOS sensors and CCD sensors, are arrayed to acquire an optical image. The RGBC Bayer is a collection of a plurality of types of optical filters whose pass bands are different from each other. Each light-receiving element is configured to receive incident light via any one of the optical filters configuring the RGBC Bayer. Each light-receiving element has a light-receiving band which is sensitive at least to a wavelength corresponding to visible light.

Figure 11A:
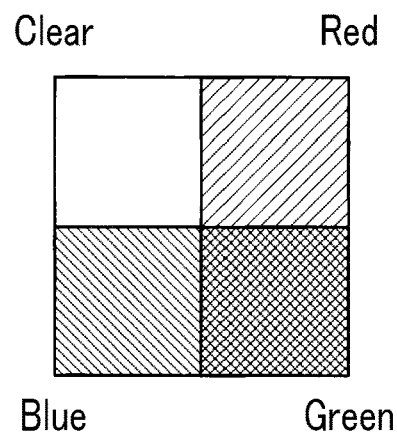
FIGS. 11A and 11B are diagrams illustrating a unit pattern and a general pattern, respectively, each showing an arrangement of filters that configure an RGBC Bayer.
Figure 11B:
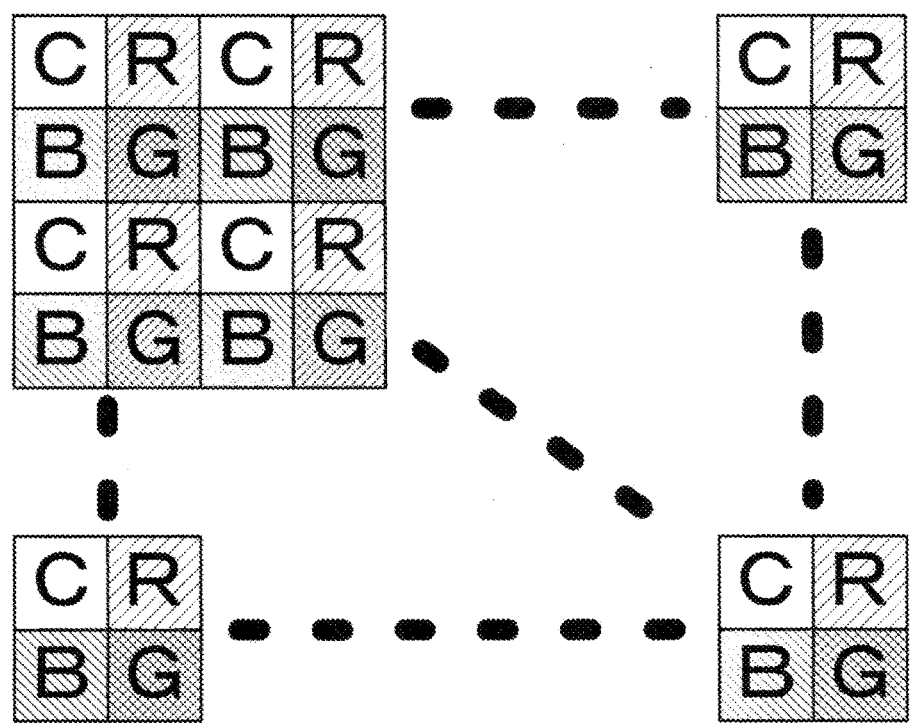

The RGBC Bayer includes optical filters which are correlated to the respective light-receiving elements and arranged in a pattern. The RGBC Bayer here is formed of four types of optical filters which are R (red) filters, G (green) filters, B (blue) filters and C (clear) filters. FIG. 11A is a diagram illustrating a unit pattern that corresponds to the four pixels. FIG. 11B is a diagram illustrating a general pattern in which a collection of the unit patterns is arranged entirely covering the array type image sensor. In the following description, the four types of optical filters configuring the RGBC Bayer are referred to R filters, G filters, B filters and C filters.

FIG. 12 is a graph showing transmission characteristics of the filters of the RGBC Bayer. As shown in FIG. 12, the R, G and B filters (hereinafter also referred to collectively as "color filters") have pass bands which are set so as to pass light with wavelengths corresponding to specified colors (red, green and blue). The pass band of the C filters is set so as to entirely include the pass bands of the three types of color filters and to have a quantum efficiency equal to or more than those of the color filters in each wavelength. In other words, the color filters correspond to the limited filters and the C filters correspond to the all-pass filters.

Further, the sensor section 110 includes an amplifier and an A/D converter, both not shown. The amplifier amplifies with a predetermined gain the outputs that are read out from the light-receiving elements configuring the image sensor assembly 160 (the outputs being analog signals indicating the brightness of the respective pixels), and the A/D converter converts the amplified analog values to digital values (pixel values) and outputs the converted values to the signal processing section 120. The output of the sensor section 110 is hereinafter referred to as "Bayer image data" (corresponding to the general image data), and the image expressed by the Bayer image data is referred to as "Bayer image".

<Signal Processing Section>

The signal processing section 120 is mainly configured by a well-known microcomputer at least including CPU, RAM and ROM. The ROM stores a control program for performing an image data generation process and an object detection process described later.

Figure 13:
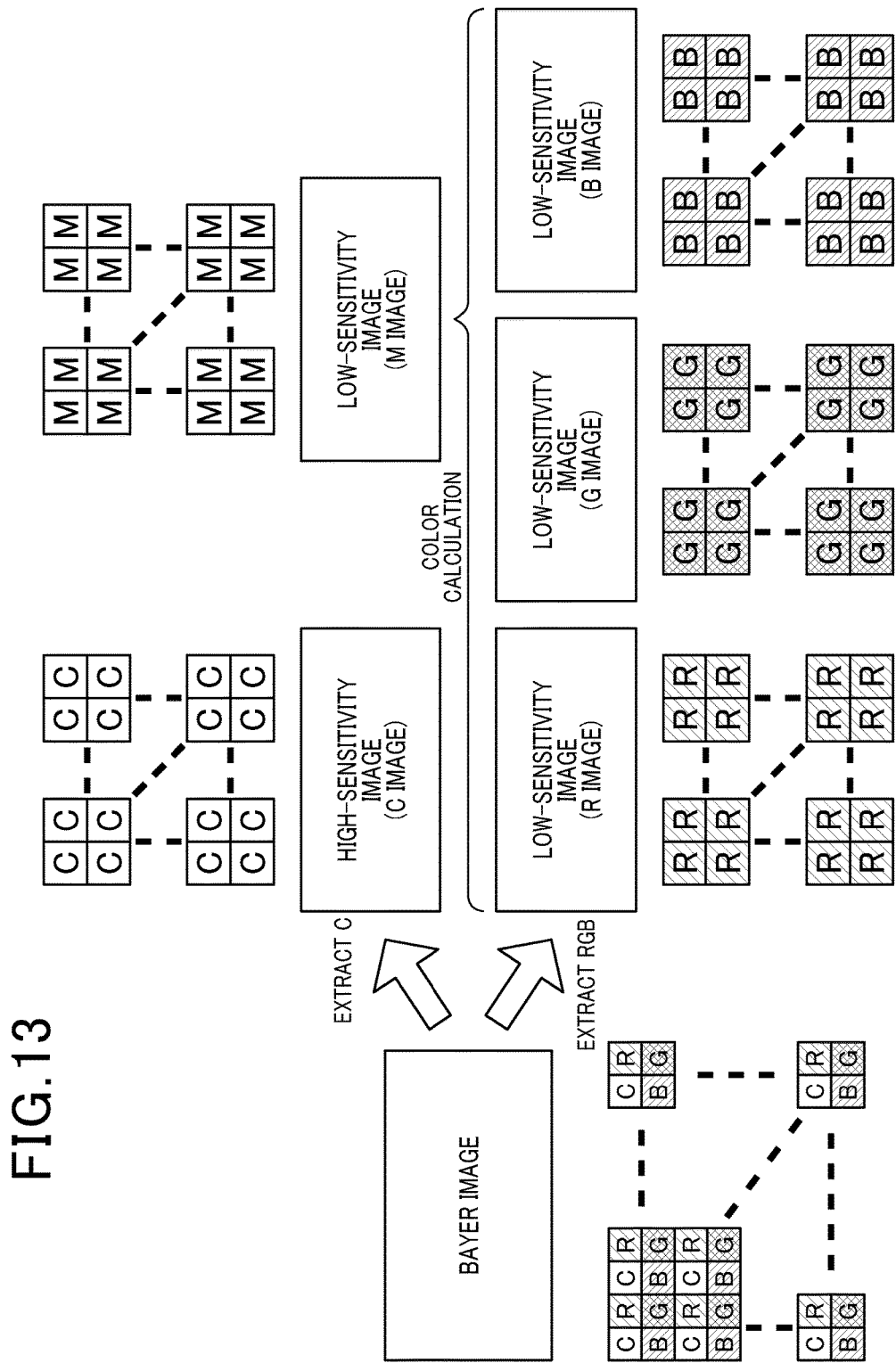
FIG. 13 is a diagram illustrating an image data generation process performed by a signal processing section.

FIG. 13 is a diagram illustrating the image data generation process performed by the signal processing section 120. As shown in FIG. 13, in the image data generation process, upon acquisition of the Bayer image data corresponding to one frame from the sensor section 110, the signal processing section 120 extracts the outputs of the light-receiving elements correlated to the C filters to generate high-sensitivity image data that represents a C image. At the same time, the signal processing section 120 extracts, for each type of color filters, the outputs of the light-receiving elements correlated to each type of the color filters, thereby generating three different low-sensitivity image data that represent an R image, a G image and a B image, respectively. The four different image data obtained in this way are hereinafter referred to as discrete image data.

The filters configuring the RGBC Bayer are uniformly arranged over the entire Bayer image. Accordingly, the discrete image data generated for the individual types of filters are under conditions in which the angles of view and the resolutions are substantially the same.

In the image data generation process, the signal processing section 120 may perform color calculation (summing at a predetermined ratio) on the basis of the three pieces of different low-sensitivity image data to generate one or more different M images (low-sensitivity images of black and white or of arbitrary colors) and the generated M images may be added to the discrete image data.

Figure 14:
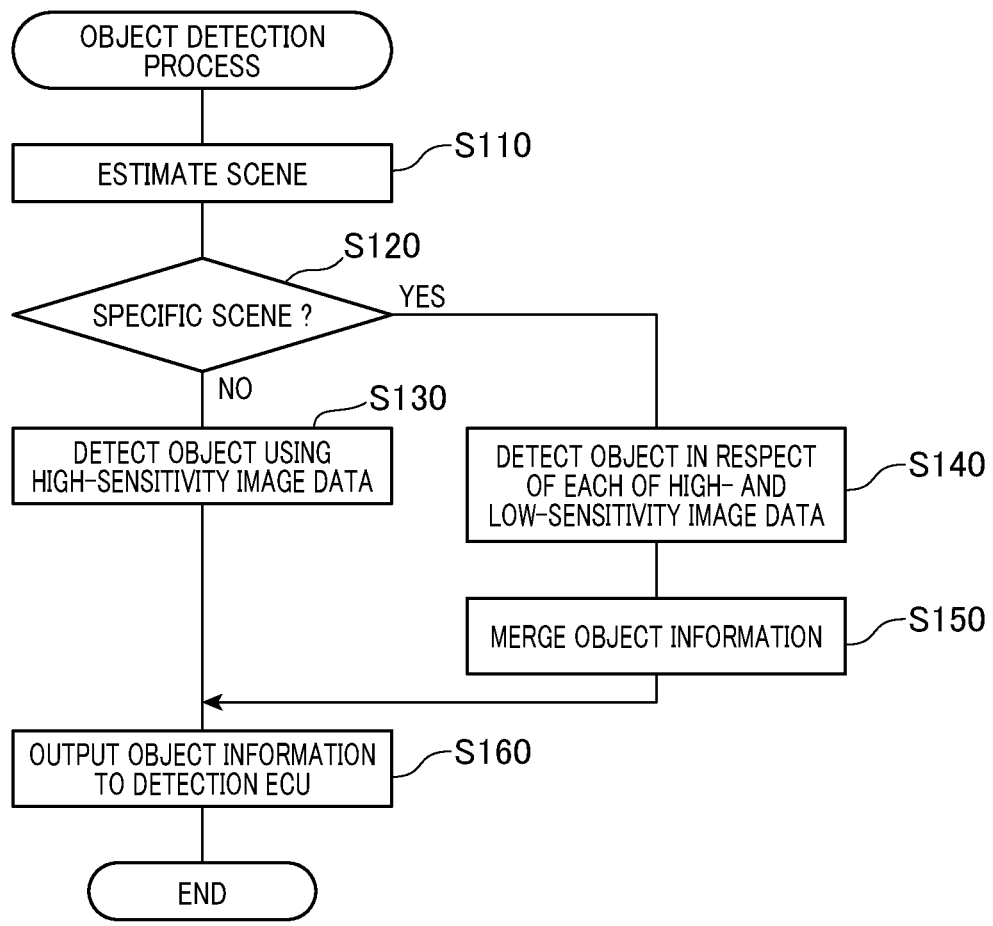
FIG. 14 is a flow diagram illustrating an object detection process performed by the signal processing section.

Referring to FIG. 14, the object detection process is described. FIG. 14 is a flow diagram illustrating the object detection process performed by the signal processing section 120. The object detection process is started every time the discrete image data corresponding to one frame are generated through the image data generation process.

In the present process, the signal processing section 120 estimates as to what scene is represented by the image (Bayer image) of the Bayer image data that has been acquired by the sensor section 110 (step S110). Then, the signal processing section 120 determines whether or not the estimated scene is a specific scene having a probability of including overexposure areas or underexposure areas due to an insufficient dynamic range (step S120).

Specifically, the signal processing section 120 determines whether or not the estimated scene is a specific scene on the basis of the probability that the image has areas where the brightness is extremely different from other areas in the image. For example, such a specific scene may be a scene that includes an image of a construction (building) that casts a shadow equal to or larger than an object, such as a scene near the entrance/exit of a tunnel, a scene under an elevating structure, or a scene by the side of a building. Such a specific scene can be determined, for example, from the map data (prepared map information) near the present location which is acquired from the navigation apparatus, or the detection results in the past of the object detection process. Alternatively, the determination on the specific scene may be made by making a comparison in the brightness between various portions in the image, on the basis of the Bayer image data or the discrete image data.

If it is determined that the estimated scene is not a specific scene (NO in step S120), the signal processing section 120 performs a process of detecting an object taken in the image on the basis of the high-sensitivity image data (C image data) and generates object information related to the detected object (step S130).

If it is determined that the estimated scene is a specific scene (YES in step S120), the signal processing section 120 selects the high-sensitivity image data and at least one piece of low-sensitivity image data, performs, for each of the selected image data, a process of detecting an object taken in the image, and generates object information related to the detected object (step S140). Further, the signal processing section 120 merges the object information generated in step S140 for the individual image data (step S150). In this case, the objects detected at an identical position in both image data are regarded as being an identical object and combined into one. In other words, since the image data are acquired simultaneously, the objects detected at the same position can be immediately determined to be an identical object without performing another processing, such as tracking.

Then, the signal processing section 120 outputs, to the detection ECU 30, the object information generated in step S130 or S150 together with predetermined image data to be displayed (e.g., the high-sensitivity image data or the image data used for detecting an object) (step S160). Then, the present process is terminated. It should be noted that, in step S160, the object information alone may be outputted to the detection ECU 30.

<Advantageous Effects>

As described above, the vehicle control system 100 generates a plurality of discrete image data having different degrees of brightness (sensitivity) from a piece of Bayer image data. Further, for a specific scene having a high contrast and an insufficient dynamic range, an object is detected using the plurality of discrete image data having different degrees of brightness. Accordingly, for example, in the event that there are areas in any of the high- or low-sensitivity image data, in which an overexposure or an underexposure is caused, an object that is present in the areas is detected on the basis of other image data which are not in such conditions. Thus, objects that are present in the imaging range can be detected without any omission. Specifically, the vehicle control system 100 is able to detect, without any omission, an object which is located in a spot where the object is difficult to detect due to the shadow of a large construction. Such an object includes, for example, a vehicle near the entrance/exit of a tunnel, a pedestrian by the side of a building, a vehicle under an elevating structure, or a vehicle by the side of a bridge rail.

The plurality of discrete image data are generated from a piece of Bayer image data acquired at the same instant. Accordingly, no positional offset of an object is caused between the discrete image data. Thus, the objects that are present at the same position are immediately determined to be an identical object. As a result, an erroneous detection of an object is prevented, i.e. the accuracy of detecting an object is improved, without the necessity of performing a special processing, such as tracking.

[Third Embodiment]

Figure 15:
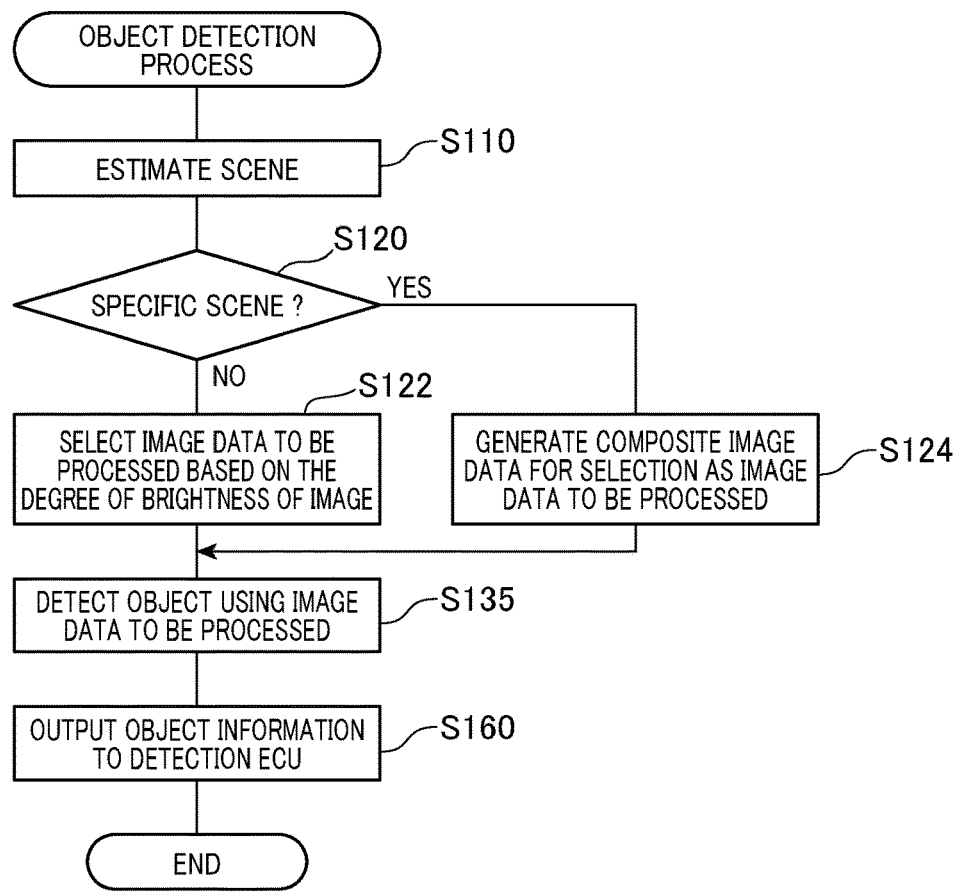
FIG. 15 is a flow diagram illustrating an object detection process, according to a third embodiment.

Referring now to FIG. 15, a third embodiment is described. The third embodiment has a basic configuration similar to that of the second embodiment, with an only difference from the second embodiment being the object detection process performed by the signal processing section 120. Therefore, the following description is focused on the difference, omitting the explanation on the common configuration. Further, in the second and the subsequent embodiments, the components identical with or similar to those in the second embodiment are given the same reference numerals for the sake of omitting unnecessary explanation.

<Object Detection Process>

FIG. 15 is a flow diagram illustrating an object detection process according to the third embodiment. Upon start of the present process, the signal processing section 120 performs scene estimation (step S110) and determines whether or not the estimated scene is a specific scene (step S120).

If it is determined that the estimated scene is not a specific scene (NO in step S120), the signal processing section 120 selects image data to be processed (step S122). Specifically, the signal processing section 120 selects the high-sensitivity image data (C image data) as image data to be processed, if an average brightness of the image based on the C image data is equal to or lower than a predetermined threshold, but selects low-sensitivity image data (any of the R, G, B and M image data) as image data to be processed, if the average brightness is higher than the threshold.

If it is determined that the estimated scene is a specific scene (YES in step S120), the signal processing section 120 generates composite image data by combining the high-sensitivity image data with low-sensitivity image data, and selects the composite image data as image data to be processed (step S124).

In generating the composite image data, the low-sensitivity image data is applied to portions which, if any, are extremely brighter than other portions (areas having a probability of suffering from overexposure) and the high-sensitivity image data is applied to other portions. In contrast, in generating the composite image data, the high-sensitivity image data is applied to portions which, if any, are extremely darker than other portions (areas having a probability of suffering from underexposure) and the low-sensitivity image data is applied to other portions.

Then, the signal processing section 120 performs a process for detecting an object present in the image on the basis of the image data to be processed selected in step S122 or S124 and generates object information related to the detected object (step S135).

Then, the signal processing section 120 outputs the object information generated in step S135 together with predetermined image data to be displayed to the detection ECU 30 (step S160). Then, the present process is terminated.

<Advantageous Effects>

In the present embodiment, when the estimated scene is a specific scene, a piece of composite image data is generated from the plurality of discrete image data generated through the image data generation process, and an object is detected using the composite image data. In this way, since only one image data is to be processed in the object detection process, the processing load in the object detection process is mitigated.

[Fourth Embodiment]

A fourth embodiment is described. The fourth embodiment has a basic configuration similar to that of the second embodiment, with an only difference from the second embodiment being the object detection process and a part of the processes performed by the detection ECU 30. Therefore, the following description is focused on the difference, omitting the explanation on the common configuration.

<Detection ECU>

In addition to the processes for realizing the various controls over the vehicle described in the second embodiment, the detection ECU 30 performs the following process. In the process, the detection ECU 30 (external unit) outputs, to the image sensor 10, an image data designation instruction that designates image data to be processed which is suitable for detecting an object and necessary for the effectively operating vehicle controls, on the basis of the conditions of the vehicle controls and the conditions surrounding the vehicle (weather, time of day, etc.) obtained from the in-vehicle sensors 50.

<Signal Processing Section>

The signal processing section 120 stores the image data designation instruction from the detection ECU 30 in a predetermined storage area of the RAM.

Then, the object detection process described referring to FIG. 14 or 15 is performed.

However, when the process shown in FIG. 14 is performed, the signal processing section 120 detects an object, in step S130, using discrete image data or composite image data, which is designated by the image data designation instruction that has been stored in the storage area.

When the process shown in FIG. 15 is performed, the signal processing section 120 selects, in step S122, discrete image data or composite image data as image data to be processed which is designated by the image data designation instruction that has been stored in the storage area.

<Advantageous Effects>

According to the present embodiment, an object is detected using discrete image data or composite image data, which is suitable for the vehicle controls currently performed. Thus, the accuracy of detecting an object is further improved.

Specifically, for example, when vehicle controls required for detecting a forward vehicle as an object are underway at nighttime, the detection ECU 30 can output an image data designation instruction for using low-sensitivity image data for the detection of the object because the tail lights of the forward vehicle are extremely bright. Also, when vehicle controls required for detecting a pedestrian as an object are underway at nighttime, the detection ECU 30 can output an image data designation instruction for using high-sensitivity image data for the detection of the object because pedestrians appear dark.

[Other Embodiments]

It will be appreciated that the present invention is not limited to the configurations described above, but any and all modifications, variations or equivalents, which may occur to those who are skilled in the art, should be considered to fall within the scope of the present invention.

(1) In the foregoing embodiments, there is no definition on the relationship between the imaging range of the image sensor 10 and the exploration range of the radar sensor 20. The imaging range and the exploration range may be determined so as to be overlapped with each other, or may be determined so as to be different from each other. In the case of the former in particular, the data obtained by different types of sensors are comprehensively dealt with. Such sensor fusion can realize higher recognition functions and further improve the accuracy in the detection of an object.

Figure 16:
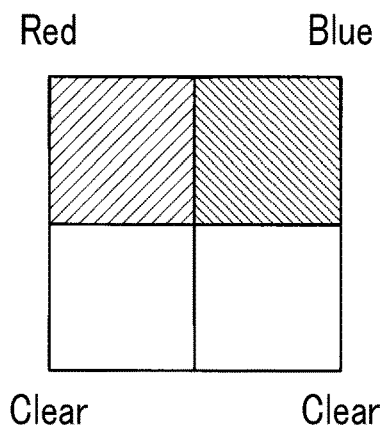
FIG. 16 is a diagram illustrating another configuration example of a basic pattern of Bayer (basic Bayer filter).

(2) As shown in FIGS. 11A and 11B, different filters are arranged in the four respective pixels of the unit pattern of the RGBC Bayer. Alternatively, different filters may be arranged in the unit pattern on a row-specific basis in the direction of reading the output of the light-receiving elements. For example, as shown in FIG. 16, when the direction of reading the output of the light-receiving elements is the left-and-right direction in the figure, a combination of the R and G filters may be arranged in the upper half, and the C filters alone may be arranged in the lower half. In this case, under the condition that high-resolution image data (C image data) alone is required, only the data in the rows of the light-receiving elements arranged being correlated to the C filters may be read from the sensor section, thereby contributing to reducing the amount of processing. The arrangement of the filters is not limited to the one in the example shown in FIG. 16. For example, monochromatic filters may be alternately arranged in the unit pattern on a row-specific basis. For example, a row of the R filters may be alternated with a row of the C and R filters.

(3) In the foregoing embodiments, the sensor section 110 is configured so that the light-receiving elements can receive the incident light via the RGBC Bayer. Accordingly, a plurality of discrete image data having different degrees of brightness are ensured to be generated from the Bayer image data outputted from the sensor section 110. Similar to this, the radar sensor 20 may also be configured by a receiver section that includes a plurality of types of filters having different pass bands, and a plurality of receiving elements for receiving electromagnetic waves via the respective filters. Thus, based on a general scan data set corresponding to the output of the receiver section, the outputs from the receiving elements correlated to the same type of filters can be extracted. Thus, discrete scan data sets that are the scan data sets of the individual types of the filters may be generated. Then, an object may be ensured to be detected on the basis of the discrete scan data sets or a composite scan data set obtained by combining the discrete scan data sets.

(4) In the foregoing embodiments, the object detection process is performed by the signal processing section 120 of the image sensor 10. Alternatively, the object detection process may be performed by the detection ECU 30. Further, the signal processing section 120 may be omitted from the image sensor 10, and the processes performed by the signal processing section 120 may all be performed by the detection ECU 30.

(5) In the foregoing embodiments, a scene is estimated and, depending on whether the scene is a specific scene, discrete image data used for the detection of an object is ensured to be selected, or composite image data for the detection is ensured to be generated. Alternatively, composite image data may be ensured to be generated from the discrete image data without estimating or judging a scene. For example, in an image, a vehicle in a far distance tends to appear brightly reflecting the sun, for example. Accordingly, composite image data may be generated using low-sensitivity image data for a far distance area, and high-sensitivity image data for a short distance area.

(6) In the foregoing embodiments, any of the discrete image data is used as it is in each area of an image when generating composite image data. Alternatively, image data with a pixel value of an increased bit size and with an adjusted pixel value may be generated as composite image data, so that the dynamic range of the high-sensitivity image data and that of the low-sensitivity image data can both be expressed by single image data.

(7) In the foregoing embodiments, high-sensitivity image data is used when the estimated scene is not a specific scene, while high- and low- sensitivity image data are used singly or in combination when the estimated scene is a specific scene. Alternatively, high-sensitivity image data may be used when the estimated scene is a specific scene, while low-sensitivity image data may be used when the estimated scene is not a specific scene.

(8) In the foregoing embodiments, the high- and low-sensitivity image data are used singly or in combination. However, the high- and low-sensitivity image data may be used through comparison. For example, dark tail lamps in a far distance may have a small pixel value and thus may be drowned out by noise. To cope with this, low-sensitivity image data may be compared with high-sensitivity image data corresponding to the low-sensitivity image data to determine whether or not the candidates of the light sources are noise. In other words, the R image may be checked using the C image. Specifically, if the C pixel value is not larger than the R pixel value by a predetermined factor or more, the candidates of the light sources may be determined to be noise. Thus, a method of using image data can be suitably applied to a system such as for auto high beam, which is based on light source recognition such as of the tail lamps of a preceding vehicle or the head lights of an on-coming vehicle. Thus, the accuracy of recognizing light sources can be improved.

(9) In the foregoing embodiments, the scene determined to be a specific scene is specifically exemplified to be a scene in which a construction casts a shadow with a size equal to or larger than an object, such as a shadow near the exit/entrance of a tunnel, a shadow under an elevating structure or a shadow by the side of a building. However, a daytime scene or a nighttime scene may be determined to be another example of a specific scene. For example, in determining a daytime scene or a nighttime scene, a luminance sensor may be used. If the luminance is lower than a predetermined threshold, the scene may be determined to be a nighttime scene. On the other hand, in a bright daytime scene, low-sensitivity image data may be used to lower the sensitivity. Thus, a target having a periodicity (e.g., vehicle light, LED electronic sign, or traffic light) can be imaged with a longer exposure time, thereby preventing flickering. Further, since a dark nighttime scene contrarily has a high probability of being drowned by noise due to the lowering of sensitivity, high-sensitivity image data may be used. Thus, a method of using image data can be suitably applied to a system such as for speed warning or sign display based on sign recognition. Thus, the accuracy of recognizing signs can be improved.

However, in a dark nighttime scene, if a sign is illuminated with a high beam, the picked-up image may be saturated, disabling recognition of the sign. In this case, whether an image is saturated may be used as a basis for determining a specific scene. If the image is saturated, low-sensitivity image data may be used.

In a bright daytime scene, an image may become extremely dark due to backlight or the like. In this case, whether an image is extremely dark may be used as a basis for determining a specific scene. If an image is extremely dark, high-sensitivity image data may be used to raise the sensitivity.

(10) The components of the present invention are conceptual and should not be construed as being limited to the components of the foregoing embodiments. For example, the function possessed by a single component may be split into a plurality of components, or the functions possessed by a plurality of components may be combined into a single component. Further, at least a part of the configuration in each of the foregoing embodiments may be replaced by a known configuration having the same function. In addition, at least a part of the configuration in each of the foregoing embodiments may be added to or replaced by a different one of the foregoing embodiments.

Hereinafter, aspects of the above-described embodiments will be summarized.

As an aspect of the embodiment, an in-vehicle camera is provided which has a case and a lens, and which is attached in a vehicle interior so that the lens is exposed at a top face of the case and the top face is opposed to a windshield. The top face has an angular shape bent at a ridge line passing through the top face. The lens is positioned in the vicinity of the ridge line.

According to the in-vehicle camera, since the top face of the case has the above shape, at least portion of the ridge line of the top face of the case can be close to the windshield in both cases where the windshield has a large inclination angle and where the windshield has a small inclination angle. In addition, since the lens is positioned in the vicinity of the ridge line, the lens can be close to the windshield in cases where the inclination angle of the windshield is either relatively large or relatively small.

As a result, reflection can be prevented. In addition, since a long hood is not required to be attached to the in-vehicle camera to prevent the reflection, the in-vehicle camera can be installed in a narrow space. In addition, since it is not required to manufacture cases having different inclination angles of the top face depending on the inclination angles of the windshields (depending on the type of vehicle), the cost of manufacturing for the in-vehicle camera can be reduced.

It is preferable that when the in-vehicle camera is attached so that the optical axis of the lens is directed to the front side and the top face is opposed to the windshield, the ridge line is a straight line perpendicular to the direction in which the windshield is inclined.

Accordingly, even if inclination angles of the windshields (e.g. downward inclination) are different from each other, all of the ridge line can be close to the windshield. Hence, the reflection can be further prevented.

In the in-vehicle camera, the angular shape of the top face is preferably formed of two flat surfaces divided by the ridge line. Accordingly, since portions of the top face except for the ridge line (portions formed of the flat surfaces) do not protrude, the ridge line can be further close to the windshield. Therefore, reflection can be further prevented.

Note that cases where the lens is positioned in the vicinity of the ridge line include a case where the edge of the lens contacts the ridge line, a case where the lens intersects with the ridge line, and a case where the distance between the edge of the lens and the ridge line is shorter than the distance between the ridge line and the windshield.

As an aspect of the embodiment, a vehicle control system includes a light-receiving section, an image data generation section, an image data processing section, and a vehicle control section.

The light-receiving section has a plurality of filters having different pass bands, and a plurality of light-receiving elements, each of which receives incident light via any one of the filters. The image data generation section extracts, when receiving general image data which is an output of the light-receiving section, outputs of the light-receiving elements correlated to the filters to generate discrete image data, which is image data for each of the filters. The image data processing section detects, based on the discrete image data generated by the image data generation section or composite image data generated by combining the discrete image data, at least one object included in a group of an obstacle, a preceding vehicle, a preceding pedestrian, a preceding object, a stationary vehicle, a stationary pedestrian, a stationary object, an on-coming vehicle, an on-coming pedestrian, an on-coming object, a lane, a road surface condition, a road shape, a light source, a road sign, a traffic signal, an entity which cuts off a field of view of the light-receiving section, and an environmental feature outside a vehicle.

The entities that cut off the field of view include, for example, stains attached to glass or lenses, cloudy weather, and shielding. The environmental features outside the vehicle include, for example, rain, snow, fog, the sky, clouds, the sun and the moon.

The vehicle control section performs, according to the object detected by the image data processing section, vehicle control regarding at least one of collision avoidance, speed warning, lane departure prevention, rear-end collision warning, inter-vehicle warning, lane departure warning, auto high beam, sign indication, full speed range adaptive cruise control, lane keeping, lane change accident prevention, blind spot warning, blind spot monitoring, automatic lane change, forward cross traffic warning, rearward cross traffic warning, erroneous pedal usage prevention, and automatic parking.

The filters correlated to the receiving elements that are the sources of generating respective discrete image data (image patterns) have different pass bands. Therefore, although the discrete image data are acquired at the same timing, the degrees of brightness of the images expressed by the discrete image data are different from each other.

The vehicle control system of the present embodiment configured in this way enables simultaneous pickup of a plurality of image data having different degrees of brightness. Accordingly, in a picked-up scene having a high contrast with an insufficient dynamic range, image data having a brightness suitable for detecting an object can be properly selected to thereby detect the objects that are present in the imaging range without omission.

Since the plurality of image data are acquired at the same timing, positional offset of an object is not caused between a plurality of images. Accordingly, the objects that are present at the same position are immediately determined to be an identical object. Thus, erroneous detection of an object is prevented and the accuracy of detecting an object is improved.

Other than the vehicle control system described above, the present embodiment can be implemented in various modes, such as: a vehicle control system that includes a receiver section, instead of the light-receiving section, for receiving electromagnetic waves; a vehicle control system that detects an object using both of the outputs of a light-receiving section and a receiver section; and an image sensor that includes a light-receiving section and an image data generation section.

What is claimed is:

1. An in-vehicle camera that is attached to a windshield of a vehicle by a bracket fixed to the windshield, the in-vehicle camera comprising:
   a lens; and
   a case, wherein
   an image taken by the in-vehicle camera is used for assistance for driving the vehicle,
   the lens is exposed to an inner surface of the windshield via an opening formed on a top face of the case,
   an optical axis of the lens is directed to a front side,
   the bracket is provided with a first structure, and the in-vehicle
   camera has a second structure engaged with the first structure,
   the second structure includes at least two components,
   the in-vehicle camera is attached to the bracket in a state where each of the at least two components engages with the corresponding first structure of the bracket,
   the in-vehicle camera is attached to the bracket in a state where the second structure is received by the first structure of the bracket, and
   the in-vehicle camera is biased downward in a state where the in-vehicle camera is attached to the bracket so that the second structure is received by the first structure of the bracket.

2. The in-vehicle camera according to claim 1, wherein the second structure includes at least four components, and
   the in-vehicle camera is attached to the bracket in a state where each of the at least four components engage with the corresponding first structure of the bracket.

3. The in-vehicle camera according to claim 1, wherein the first structure is a latch provided to the bracket, and the second structure is a projection provided to the case.

4. An in-vehicle camera that is attached to a windshield of a vehicle by a bracket fixed to the windshield, the in-vehicle camera comprising:
   a lens; and
   a case, wherein
   an image taken by the in-vehicle camera is used for assistance for driving the vehicle,
   the lens is exposed to an inner surface of the windshield via an opening formed on a top face of the case,
   an optical axis of the lens is directed to a front side,
   the bracket is provided with a first structure, and the in-vehicle
   camera has a second structure engaged with the first structure,
   the second structure includes at least two components,
   the in-vehicle camera is attached to the bracket in a state where each of the at least two components engages with the corresponding first structure of the bracket,
   the in-vehicle camera is attached to the bracket in a state where the second structure is received by the first structure of the bracket, and
   the in-vehicle camera is biased in a forward direction of the in-vehicle camera in a state where the in-vehicle camera is attached to the bracket so that the first structure of the bracket is received by the second structure.

5. The in-vehicle camera according to claim 4, wherein the second structure includes at least four components, and the in-vehicle camera is attached to the bracket in a state where each of the at least four components engage with the corresponding first structure of the bracket.

6. The in-vehicle camera according to claim 4, wherein the first structure is a latch provided to the bracket, and the second structure is a projection provided to the case.

7. An in-vehicle camera that is attached to a windshield of a vehicle by a bracket fixed to the windshield, the in-vehicle camera comprising:
a lens; and
a case, wherein
an image taken by the in-vehicle camera is used for assistance for driving the vehicle,
the lens is exposed to an inner surface of the windshield via an opening formed on a top face of the case,
an optical axis of the lens is directed to a front side,
the in-vehicle camera has a second structure to be engaged with a first structure provided with the bracket,
the case comprises a front half case and a rear half case,
the second structure includes a plurality of components,
the plurality of components are respectively provided to a right part of the front half case, a left part of the front half case, a right part of the rear half case, and a left part of the rear half case, and
the in-vehicle camera is biased downward in a state where the in-vehicle camera is attached to the bracket so that the second structure is received by the first structure.

8. The in-vehicle camera according to claim 7, wherein the second structure is provided to an upper portion of the case of the in-vehicle camera.

9. The in-vehicle camera according to claim 7, wherein the first structure is a latch provided to the bracket, and the second structure is a projection provided to the case.

10. The in-vehicle camera according to claim 7, further comprising a concave portion in the top face of the case, the concave portion being concave with respect to the periphery of the concave portion.

11. An in-vehicle camera that is attached to a windshield of a vehicle by a bracket fixed to the windshield, the in-vehicle camera comprising:
a lens; and
a case, wherein
an image taken by the in-vehicle camera is used for assistance for driving the vehicle,
the lens is exposed to an inner surface of the windshield via an opening formed on a top face of the case,
an optical axis of the lens is directed to a front side,
the in-vehicle camera has a second structure to be engaged with a first structure provided with the bracket,
the case comprises a front half case and a rear half case,
the second structure includes a plurality of components,
the plurality of components are respectively provided to a right part of the front half case, a left part of the front half case, a right part of the rear half case, and a left part of the rear half case, and
the in-vehicle camera is biased in a forward direction of the in-vehicle camera in a state where the in-vehicle camera is attached to the bracket so that the first structure of the bracket is received by the second structure.

12. The in-vehicle camera according to claim 11, wherein the second structure is provided to an upper portion of the case of the in-vehicle camera.

13. The in-vehicle camera according to claim 11, wherein the first structure is a latch provided to the bracket, and the second structure is a projection provided to the case.

14. The in-vehicle camera according to claim 11, further comprising a concave portion in the top face of the case, the concave portion being concave with respect to the periphery of the concave portion.

15. An in-vehicle camera comprising:
a lens; and
a case, wherein
the in-vehicle camera is attached in a vehicle interior so that the lens is exposed at a top face of the case and the top face is opposed to a windshield, wherein
the top face has an angular shape bent at a ridge line passing through the top face,
the lens is positioned in the vicinity of the ridge line, and
a rear end of the top face is positioned so as to be further from a surface of a top board of a bracket, which is to be attached to the windshield, than a front end of the top face is.

16. The in-vehicle camera according to claim 15, further comprising a plate spring that is provided between the bracket and the top face of the in-vehicle camera and biases the top face of the in-vehicle camera.

17. The in-vehicle camera according to claim 15, wherein a projection is provided to a side face of the in-vehicle camera, and
the projection contacts an L-shaped latch of the bracket so that the projection is latched by the bracket.

* * * * *